United States Patent
Sinaguinan (10) Patent No.: US 9,297,665 B2
(45) Date of Patent: Mar. 29, 2016

(54) SYSTEM AND METHOD FOR SENDING A DESTINATION POINT TO A VEHICLE NAVIGATION SYSTEM FROM A PORTABLE ELECTRONIC DEVICE

(71) Applicant: Honda Motor Co., Ltd., Tokyo (JP)

(72) Inventor: Justin E. Sinaguinan, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 158 days.

(21) Appl. No.: 14/261,468

(22) Filed: Apr. 25, 2014

(65) Prior Publication Data

US 2015/0308849 A1    Oct. 29, 2015

(51) Int. Cl.
G01C 21/36    (2006.01)

(52) U.S. Cl.
CPC .......... *G01C 21/362* (2013.01); *G01C 21/3611* (2013.01)

(58) Field of Classification Search
CPC . G01C 21/362; G01C 21/3611; H04W 4/021; H04W 4/023; H04M 3/42323
USPC ........................................................ 701/430
See application file for complete search history.

(56) References Cited

U.S. PATENT DOCUMENTS

| | | | |
|---|---|---|---|
| 5,654,908 A | 8/1997 | Yokoyama | |
| 6,029,110 A | 2/2000 | Zuber et al. | |
| 7,239,961 B2 | 7/2007 | Banet et al. | |
| 8,055,440 B2 | 11/2011 | Shintani et al. | |
| 8,204,686 B2 | 6/2012 | Jung et al. | |
| 8,285,453 B2 | 10/2012 | Schroeder et al. | |
| 8,559,932 B2 * | 10/2013 | Elliott ..................... | H04W 4/16 455/418 |
| 2009/0082951 A1 | 3/2009 | Graessley | |
| 2012/0053787 A1 | 3/2012 | Shintani et al. | |

OTHER PUBLICATIONS

Website: "Send results and directions to your car or navigation device—Google Maps Help" https://support.google.com/maps/answer/75505?hl=en, printed Feb. 26, 2014.

* cited by examiner

*Primary Examiner* — Richard Camby
(74) *Attorney, Agent, or Firm* — Rankin, Hill & Clark LLP (57) ABSTRACT

A method and system for sending a destination point to a vehicle navigation system from a portable electronic device. The method and system include connecting one or more portable electronic devices to the navigation system. The method and system additionally include identifying a user classification category of one or more users that are operating the one or more portable electronic devices that are connected to the navigation system. Additionally, the method and system include sending the desired destination point from the one or more portable electronic devices to the navigation system based on the user classification category. The sending of the desired destination point occurs upon determining that the navigation system is locked out and includes the navigation system computing a navigational route to the desired destination point sent from the one or more portable electronic devices to the navigation system.

20 Claims, 4 Drawing Sheets

SYSTEM AND METHOD FOR SENDING A DESTINATION POINT TO A VEHICLE NAVIGATION SYSTEM FROM A PORTABLE ELECTRONIC DEVICE

BACKGROUND

Vehicle navigation systems have become highly sophisticated over the years. These systems are able to provide various types of route guidance to drivers utilizing various types of interfaces that allow drivers and/or passengers to provide destination point inputs. However, as these systems are advancing in terms of their utility, user interfaces are becoming more complex with more user interface inputs, menus, various graphical user interface screens and sub-screens. The complexity associated with the navigation system user interfaces tend to be confusing to users and can be especially complex for drivers who are trying to find various screens to input different types of destination points (e.g., addresses, points of interests, favorites, etc.) while driving the vehicle.

Another complexity associated with current navigation systems is that some drivers attempt to input destinations to the navigation system while the vehicle is being driven and is in motion. This issue causes a high amount of driver distraction that can contribute to unsafe driving habits and higher risk of accidents. For example, a driver can mistype the characters that form a street address destination and subsequently, requires the driver to retype the destination. Such mistyping and retyping can increase the probability of visual, manual, and cognitive distraction from driving that can compromise the safety of the occupants of the vehicle or other vehicles on the road. In order to avoid these distractions, in many cases, the driver has to stop the vehicle to input a destination point before proceeding on the guided route.

SUMMARY

According to one aspect, a method for sending a destination point to a vehicle navigation system from a portable electronic device is provided. The method can include connecting one or more portable electronic devices to the navigation system. The method can include determining a navigation system lockout state based on a state of motion of the vehicle. The method also includes identifying a user classification category of one or more users that are operating the one or more portable electronic devices that are connected to the navigation system. The method additionally can include sending the desired destination point from the one or more portable electronic devices to the navigation system based on the user classification category. The sending of the desired destination point from the one or more portable devices to the navigation system occurs upon determining that direct input to a user interface of the navigation system is locked out and includes the navigation system computing a navigational route to the desired destination point sent from the one or more portable electronic devices to the navigation system.

According to a further aspect, a system for sending a destination point to a vehicle navigation system from a portable electronic device is provided. The system can include a device destination pointer application that is executed on one or more portable electronic devices that connects the one or more portable electronic devices to the navigation system. The system can include a navigation system lockout module that is included as a module of the device destination pointer application that determines a navigation system lockout state based on a state of motion of the vehicle and a user processing module that is included as a module of the device destination pointer application that identifies a user classification category of one or more users that are operating the one or more portable electronic devices that are connected to the navigation system. The system additionally can include a destination sending module that is included as a module of the device destination pointer application that sends the desired destination point from the one or more portable electronic devices to the navigation system based on the user classification category. The destination sending module sends the desired destination point from the one or more portable devices to the navigation system upon determining that the navigation system is locked out and can include the navigation system computing a navigational route to the desired destination point sent from the one or more portable electronic devices to the navigational unit.

According to still another aspect, a computer readable medium including instructions that when executed by a processor execute a method for sending a destination point to a vehicle navigation system from a portable electronic device is provided. The method can include connecting one or more portable electronic devices to the navigation system. The method can include determining a navigation system lockout state based on a state of motion of the vehicle. The method also includes identifying a user classification category of one or more users that are operating the one or more portable electronic devices that are connected to the navigation system. The method additionally can include sending the desired destination point from the one or more portable electronic devices to the navigation system based on the user classification category. The sending of the desired destination point from the one or more portable devices to the navigation system occurs upon determining that the direct input to a user interface of the navigation system is locked out and includes the navigation system computing a navigational route to the desired destination point sent from the one or more portable electronic devices to the navigational unit.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that can be used for implementation. The examples are not intended to be limiting.

A "processor," as used herein, processes signals and performs general computing and arithmetic functions. Signals processed by the processor can include digital signals, data signals, computer instructions, processor instructions, messages, a bit, a bit stream, or other computing that can be received, transmitted and/or detected.

A "bus," as used herein, refers to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

A "memory," as used herein can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

An "operable connection," as used herein can include a connection by which entities are "operably connected", is one in which signals, physical communications, and/or logical communications can be sent and/or received. An operable connection can include a physical interface, a data interface and/or an electrical interface.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

An "input device" as used herein can include devices for controlling different vehicle features which are include various vehicle components, systems, and subsystems. The term "input device" includes, but it not limited to: push buttons, rotary knobs, and the like. The term "input device" additionally includes graphical input controls that take place within a user interface which can be displayed by various types of mechanisms such as software and hardware based controls, interfaces, or plug and play devices.

An "output device" as used herein can include devices that can derive from vehicle components, systems, subsystems, and electronic devices. The term "output devices" includes, but is not limited to: display devices, and other devices for outputting information and functions.

Figure 1:
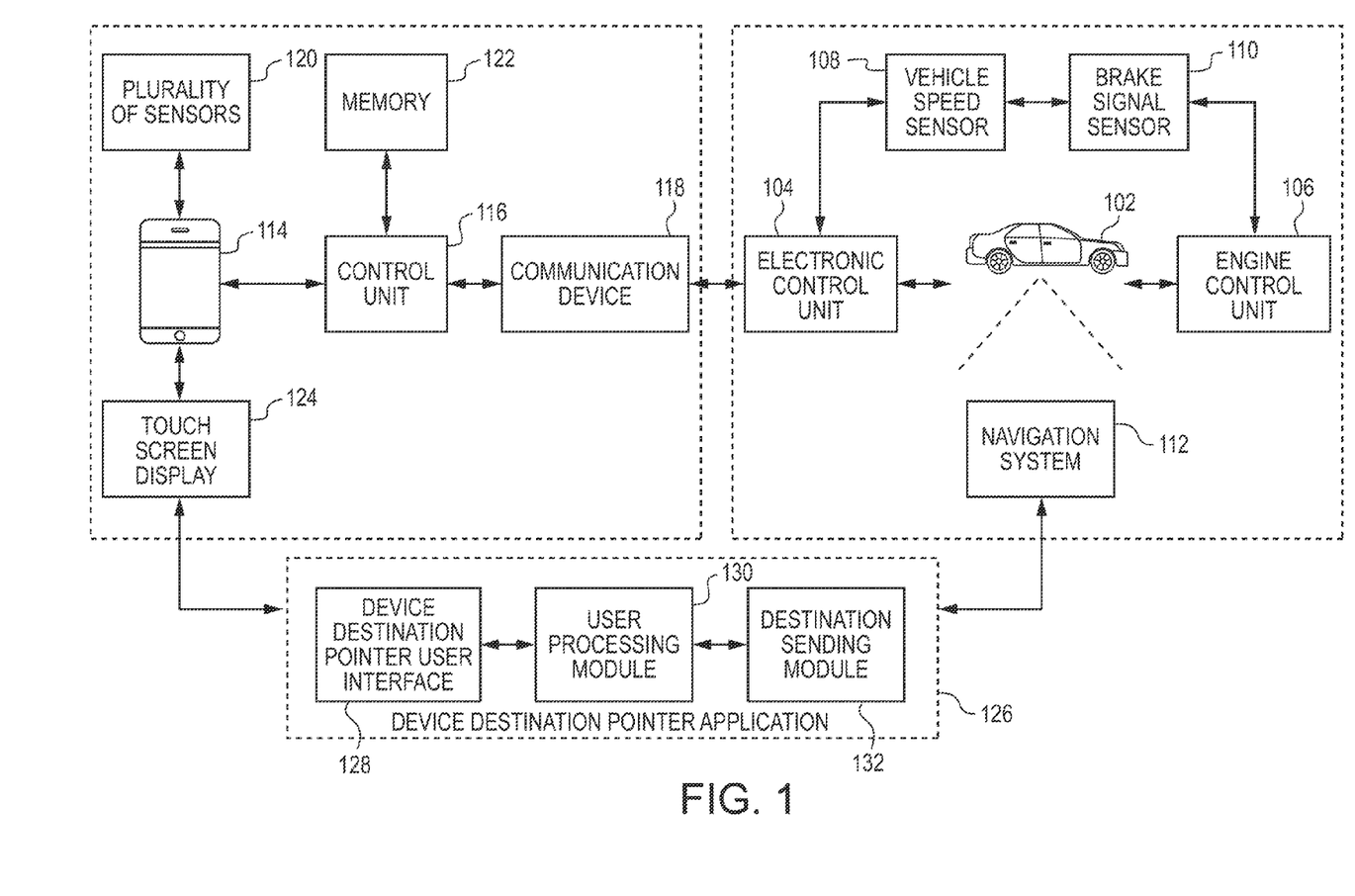
FIG. 1 is a schematic view of an exemplary device destination pointer system for inputting destinations from a portable electronic device to a vehicle navigation system according to an embodiment.

Referring now to the drawings, wherein the showings are for purposes of illustrating one or more exemplary embodiments and not for purposes of limiting the same. FIG. 1 shows a schematic view of an exemplary operating environment of a device destination pointer system 100 and exemplary methods according to an embodiment. The components of the device destination pointer system 100, as well as the components of other systems, hardware architectures and software architectures discussed herein, can be combined, omitted or organized into different architecture for various embodiments. However, the exemplary embodiments discussed herein focus on the environment 100 as illustrated in FIG. 1, with corresponding system components, and related methods.

As shown in the illustrated embodiment of FIG. 1, the vehicle 102 generally includes an electronic control unit 104 that operably controls a plurality of vehicle systems. The vehicle systems include, but are not limited to, the vehicle navigation system 112 among others including vehicle HVAC systems, vehicle audio systems, vehicle video systems, vehicle infotainment systems, vehicle telephone systems, and the like. The vehicle navigation system 112 is connected to a vehicle GPS sensor (not shown) that can also be connected to the electronic control unit 104 to localize (i.e., determine the GPS coordinates) the vehicle 102. In an alternate embodiment, the vehicle navigation system 112 includes its own processor and memory that communicate with the GPS sensor to determine and provide route guidance to the driver of the vehicle 102.

The electronic control unit 104 includes internal processing memory, an interface circuit, and bus lines for transferring data, sending commands, and communicating with the vehicle systems. Generally, the electronic control unit 104 includes a processor and memory (not shown). The vehicle 102 also includes a communication device (not shown) for sending data internally in the vehicle 102 to systems including the vehicle navigation system 112 and externally to connected devices. The communication device included within the vehicle 102 is also connected to the electronic control unit 104 and is capable of providing wired or wireless computer communications utilizing various protocols to be utilized to send/receive electronic signals internally to features and systems within the vehicle 102 and to external devices. Generally, these protocols include a wireless system (e.g., IEEE 802.11, IEEE 802.15.1 (Bluetooth®)), a near field communication system (NFC) (e.g., ISO 13157), a local area network (LAN), and/or a point-to-point system. Additionally, the communication device of the vehicle 102 is operably connected for internal computer communication via a bus (e.g., a Controller Area Network (CAN) or a Local Interconnect Network (LIN) protocol bus) to facilitate data input and output between the electronic control unit 104 and vehicle features and systems.

The vehicle 102 also includes an engine control unit 106 that can control and provide data regarding the vehicle speed, idle speed, and engine throttle positions. The engine control unit 106 can also determine the status of vehicle components that are operably connected to the engine of the vehicle 102. For example, the engine control unit 106 can determine the quantity of fuel that is injected into the engine from the fuel injection system when the driver is pushing an accelerator. In an exemplary embodiment, a transmission control unit (not shown) is also included within the vehicle 102 as a separate component that is operably connected to the engine control unit 106 to provide data regarding the vehicle transmission (i.e., power train) system. The engine control unit 106 and/or the transmission control unit can provide data to the electronic control unit 104 and/or vehicle systems (e.g., the navigation system 112) that the vehicle 102 is or is not in a state of motion.

The engine control unit 106 and transmission control unit can include internal processing memory, an interface circuit, and bus lines for transferring data, sending commands, receiving data, and communicating with vehicle components. In an exemplary embodiment, the electronic control unit 104 is operably connected to a plurality of vehicle sensors that includes but are not limited to a vehicle speed sensor 108 (that can include wheel speed sensors) and a brake signal sensor 110.

The vehicle speed sensor 108 provides speed data related to the vehicle 102 as it is in operation. In other words, the vehicle speed sensor 108 provides data to the electronic control unit 104 and/or the vehicle system that the vehicle 102 is or is not in a state of movement. The brake signal sensor 110 can sense signals that are sent from the vehicle braking system and/or a brake light switch to determine when the vehicle brakes are engaged and disengaged by the driver. The brake signal sensor 110 can also include brake pad sensors that provide actuation data each time the brake pads of the vehicle 102 are utilized to provide vehicle braking. The brake signal sensor 110 can also provide information as to when the vehicle 102 is not in a state of movement.

In one embodiment, the engine control unit 106 provides data that it monitors and/or obtains by the vehicle speed sensor 108 and/or the brake signal sensor 110 and provides this data to the electronic control unit 104 as data regarding movement of the vehicle 102. In an alternate embodiment, the electronic control unit 104 is operably connected to the vehicle speed sensor 108, the brake signal sensor 110, and/or the engine control unit 106 and can collect data to regarding the movement of the vehicle 102. The electronic control unit 104 analyzes the data and determines if the vehicle 102 is in movement and/or is in a fully stopped state.

The electronic control unit 104 operably enables and disables the user interface of the navigation system 112 based on this determination. In an exemplary embodiment, when the electronic control unit 104 determines that the vehicle 102 is in a state of movement, the user interface of the navigation system 112 is locked and disabled to ensure that the driver cannot operate to the navigation system 112 as the vehicle 102 is being driven. When the vehicle 102 is stopped (i.e., is in a fully stopped state), the electronic control unit 104 enables the user interface of the navigation system 122 to be unlocked allowing the user to operate the navigation system 122.

In one embodiment, when the navigation system 112 is in a locked state, and no directions are being provided, a live map showing the location in which the vehicle 102 is traveling is shown. If the navigation system 112 is providing guidance to a destination that was already inputted when the vehicle 102 was in a fully stopped state (i.e., when the navigation system 112 was in an unlocked state) or received inputs from an external device (as described in more detail below) when the navigation system 112 is in a locked state, the navigation system 112 continues to provide a map with turn by turn directions. However, in both of these situations neither a driver nor the passenger(s) can provide any further inputs directly onto the user interface of the navigation system 112.

As shown, in the exemplary embodiment, a portable electronic device 114 communicates directly with the electronic control unit 104 of the vehicle 102. The portable electronic device 114 and components that will be discussed herein can be utilized by one or more passengers to provide inputs to the navigation system 112 as the vehicle 102 is being driven and is in a state of movement. This functionality ensures that the passenger(s) can input destination points to the navigation system 112 while the navigation system 112 is in a locked state. The passenger(s) can input destinations and the driver can receive navigation guidance (i.e., turn-by-turn directions) to the destination of choice while the navigation system 112 interface is in a locked state. This functionality also ensures that passenger(s) that are not located in the front passenger seat of the vehicle 102 can provide destination inputs to the navigation system 112 from the rear portions of the vehicle 102. For example, passenger(s) located in the rear seat(s) of the vehicle 102 can utilize their portable electronic device 114 to provide destination inputs to the navigation system 112.

Generally, the portable electronic device 114 of the device destination pointer system 100 can be a computing device having a touch screen display 124, which enables user input (e.g., touch keyboard), and a control unit 116 for providing processing and computing functions. The portable electronic device 114 can include, but is not limited to, a handheld device, a mobile device, a smart phone, a laptop, a tablet, and an e-reader. In general, the control unit 116 is operatively connected to a plurality of sensors 120, a memory 122, a communication device 118, a touch screen display 124, and optionally any other input device (e.g., hard buttons, switches, a keyboard, etc.). The touch screen display 124 provides and facilitates user input and output. The touch screen display 124 can include a color LCD display, which includes touch screen sensors for user input that provide touch screen functionality.

The communication device 118 of the portable electronic device 114 can include antennas and components that can be utilized for wired and wireless computer connections and communications via various protocols. The communication device 118 is capable of providing a wireless system (e.g., IEEE 802.11, IEEE 802.15.1 (Bluetooth®)), a near field communication system (NFC) (e.g., ISO 13157), a local area network (LAN), a wide area network (WAN), a point-to-point system, a circuit switching system, a packet switching system, a cellular network system (e.g., CDMA, GSM, LTE, 3G, 4G), a universal serial bus, and the like.

In particular, the communication device 118 can be utilized to provide web based applications and internet resources to the user. In addition, the communication device 118 provides peer-to-peer (P2P) connections over to send/receive electronic signals with an external device to be utilized by software applications installed within the memory 122 of the portable electronic device 114. Accordingly, in the embodiment shown in FIG. 1, the communication device 118 of the portable electronic device 114 is utilized to provide P2P communications to send and receive electronic signals with the electronic control unit 104 of the vehicle 102 to be utilized by the navigation system 112 to provide destinations supplied by the passenger(s) through a device destination pointer application 126 that resides within the memory 122 of the portable electronic device 114.

In an exemplary embodiment, one or more portable electronic devices 114 can connect to the vehicle 102 via a Bluetooth® connection that can be utilized to provide data connections to support telephonic communication, play music, and/or utilize applications residing within the memory 122 of the portable electronic device 114. Specifically, the portable electronic device 114 connects via Bluetooth® to the vehicle 102 and the device destination pointer application 126 connects to the navigation system 112 directly or through the electronic control unit 104 to provide bilateral communications. In an alternate embodiment, an alternate type of wireless (e.g., Wi-Fi) connection or a wired (e.g., USB) connection can be utilized to connect the portable electronic device 114 to the vehicle 102 and can be utilized by the device destination pointer application 126 to communicate with the navigation system 112.

The plurality of sensors 120 of the portable electronic device 114 can include but are not limited to an accelerometer, a magnetometer, a gyroscope, an ambient light sensor, a proximity sensor, a global positioning sensor system, a back illuminated sensor, among others. The plurality of sensors 120 that will be discussed with reference to the components of FIG. 1 can include the magnetometer, the accelerometer, the gyroscope and the global positioning sensor system (not shown).

In an exemplary embodiment, the device destination pointer application 126 is a software application that is installed directly onto the memory 122 of the portable electronic device 114. In another embodiment, the device destination point application 126 and/or one or more of the components of the device destination point application 126 can be installed externally from the memory 122 of the portable electronic device 114. For example, the device destination point application 126 can include a web based application that is accessed by the communication device 118 of the portable electronic device 114. In other embodiments, the device destination point application 126 can include a cloud based application that resides on an external host server but is accessed through a viewer application that is installed on the memory 122 of the portable electronic device 114.

The device destination point application 126 can be initialized by user input of an executable icon on the touch screen display 124. Although the embodiments discussed herein discuss the device destination point application 126 as an independent application, the device destination point application 126 can be integrated with and/or within other vehicle 102 related software or web based applications that reside on or are accessed via the portable electronic device 114. In alternate embodiments, the device destination point application 126 can be used as a plug-in/add-on to software that is utilized during operation a web browser on the portable electronic device 114. As a plug-in/add-on, the device destination point application 126 can be automatically enabled when the web browser and/or another application is initialized by the user, or enabled upon the detection of a communication link between the communication device 118 and the electronic control unit 104 and/or navigation system 112.

The device destination pointer application 126 includes various modules, discussed in detail below, that are controlled and operated by the control unit 116 of the portable electronic device 114. As a stand alone application, the device destination pointer application 126 includes the device destination pointer user interface 128 that includes user input icons and/or user input tiles that provide passengers with the ability to select from several destination input choices. The destination input choices can include but are not limited to a street address destination input icon/tile, a point of interest destination icon/tile, a prior destination input icon/tile, a favorite destination input icon/tile, and a home destination input icon/tile, a latitude/longitude input icon/tile and the like. The passenger(s) can utilize the various user interface icons/tiles to input a destination of choice.

In the embodiment shown in FIG. 1, the functionality associated with the device destination pointer application 126 is presented through the device destination pointer user interface 128 that is presented to the user on the touch screen display 124 of the portable electronic device 114. In an exemplary embodiment, the device destination pointer application 126 enables the passenger(s) to utilize the device destination pointer system 100 to input the destination point of choice through the portable electronic device 114 to be utilized to provide route guidance through the navigation system 112 while the vehicle 102 is in movement (i.e., while the navigation system 112 is locked out). Typically, the device destination pointer application 126 ensures that it can only be utilized when it is being operated by the passenger(s) as oppose to the driver of the vehicle 102.

As discussed in detail below, in an exemplary embodiment, the device destination pointer application 126 utilizes the plurality of sensors 120 to determine a user classification category of the user that is utilizing the portable electronic device 114 to use the device destination pointer application 126. In some embodiments, the device destination pointer application 126 includes a user ID (i.e., user identification user name and password) that corresponds to the user that is utilizing the device destination pointer application 126. The destination pointer application 126 allows destinations to be input and sent to the navigation system 112 once it is determined that the user is a passenger of the vehicle 102 based off of the user classification category and/or the user identification number.

In one embodiment, the device destination point application 126 communicates with the navigation system 112 directly upon being launched to populate prior destinations, favorite destinations, home destination, and/or point of interest destinations. In an alternate embodiment, the device destination point application 126 maintains its own set of prior destinations, favorite destinations, and/or home destination based on (previous) inputs received (during previous sessions) from the passenger on the portable electronic device 114.

In an additional embodiment, the device destination point application 126 can further utilize the communication device 118 of the portable electronic device 114 to connect to an external server(s), external database(s), web based websites/systems, and/or portable device applications (e.g., search engines, social media applications, online urban guides, online recommendation services, etc.) to provide points of interest destinations (i.e., specific names of places) that are based on various point of interest categories (e.g., food, lodging, transportation, fuel, shopping, entertainment, emergency services, etc.) and a vicinity to the current location (i.e., GPS coordinates) of the vehicle 102 of specific places that fall under the point of interest categories. In some embodiments, the device destination point application 126 can be directly tied to a search engine to allow the user to input a specific name of a place that the user would like to provide as a destination point (e.g., hotel name, restaurant name, museum name, etc.).

The user processing module 130 utilizes the plurality of sensors 120 along with sensors located within the vehicle 102 to determine the directional orientation and positional location of the portable electronic device 114 with respect to the vehicle 102 as the user utilizes the portable electronic device 114 to actuate the device destination point application 126. This determination provides details as to the location of the user (utilizing the portable electronic device 114) within the vehicle 102.

The user processing module 130 utilizes the control unit 116 to access the magnetometer included within the plurality of sensors 120. The magnetometer is utilized to determine the cardinal and ordinal directional orientation and positional location of the portable electronic device 114 with respect to the vehicle 102, as described in more detail below. In one embodiment, the vehicle 102 includes an onboard digital compass (not shown) that is operably connected to the electronic control unit 104. The user processing module 130 accesses the communication device 118 to initiate communication with the electronic control unit 104 to determine the directional orientation and locational position of the vehicle 102 based on data provided by the onboard digital compass.

Figure 2:
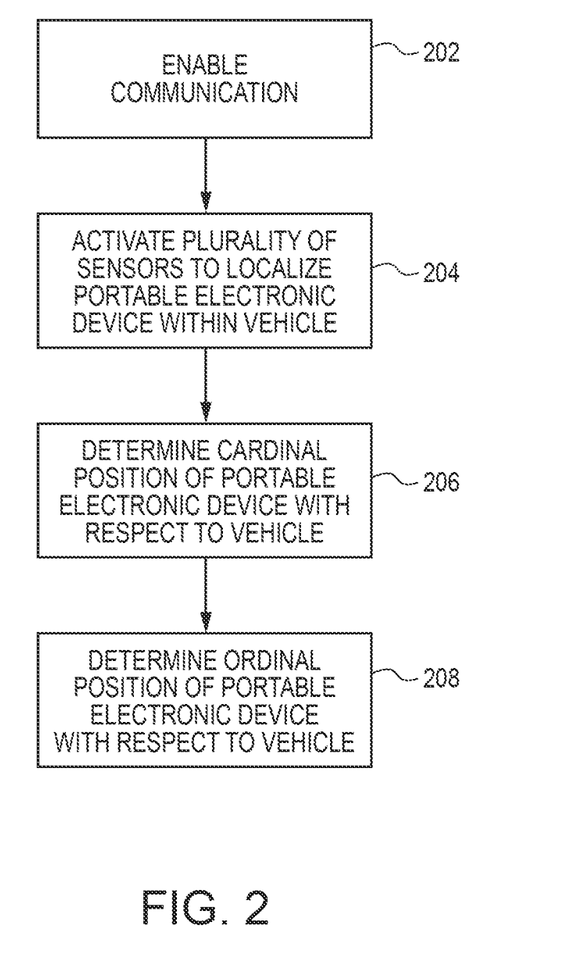
FIG. 2 is a process flow diagram of an exemplary method utilized by an exemplary embodiment of a user processing module from the operating environment of FIG. 1 according to an embodiment.

Referring now to FIG. 2, an exemplary method that can be utilized by an exemplary embodiment of the user processing module 130 is illustrated. At step 202, the communication device 118 utilizes wireless computer communications utilizing various protocols, as described above, to access the communication device of the vehicle 102 to enable communication for exchanging information with the electronic control unit 104. At step 204, the user processing module 130 activates the plurality of sensors 120 to localize the position of the portable electronic device 114 within the vehicle 102. At step 206, the user processing module 130 utilizes the plurality of sensors 120 to analyze the cardinal position of the portable electronic device 114 with respect to the vehicle 102. This analysis provides the cardinal location of the user with respect to the vehicle 102. For example, if the portable electronic device 114 is located a few degrees south of the north-facing vehicle 102, then the user processing module 130 can determine that the user can be located within the vehicle 102.

At step 208, the user processing module 130 analyzes the ordinal position of the user with respect to the vehicle 102. The user processing module 130 assigns a guidance point at a front certain portion of the vehicle 102. The portion of the vehicle 102 where the guidance point is located can vary depending on the cardinal position of the portable electronic device 114 (found in step 208). In the example provided above, if portable electronic device 114 is determined to be located south of the guidance point located at the front center portion of the vehicle 102, the user processing module 130 further analyzes if the location of the portable electronic device 114 is southeast, southwest, or directly south of the guidance point to determine the right, left, or center position of the user within the vehicle 102. Furthermore, the user processing module 130 determines how many degrees southeast, southwest, or south the portable electronic device 114 is located from the guidance point to determine if the user is located within the right, left, or center front or rear seats of the vehicle 102 when the user is capturing the image of the vehicle 102.

Other components and methods can be utilized to determine the orientation of the vehicle 102 and portable electronic device 114, and the location of the portable electronic device 114 within the vehicle 102. For example, in another embodiment, the GPS sensor system included within the plurality of sensors 120 of the portable electronic device 114 is utilized in conjunction with a GPS sensor system operably connected to the electronic control unit 104 within the vehicle 102 to triangulate and calculate the global position of the portable electronic device 114 with respect to the vehicle 102. In yet another exemplary embodiment, the GPS sensor system and the magnetometer included within the plurality of sensors 120 and the GPS sensor system and the digital compass located within the vehicle 102 can work in conjunction to determine the orientation of the vehicle 102 and the portable electronic device 114, and further triangulate the position of the portable electronic device 114 with respect to the vehicle 102.

With continued reference to FIG. 1, once the determination of the orientation and location of the portable electronic device 114 with respect to the vehicle 102 is complete, the user processing module 130 further computes and analyzes the localization data to determine a user classification category that is allocated to the user that is utilizing the device destination pointer application 126 on the portable electronic device 114. In an exemplary embodiment, the user processing module 130 categorizes the user as a 'driver' or a 'passenger' of the vehicle 102. In other embodiments, additional classifications can be designated for the user (e.g., front seat passenger, left hand side rear passenger, right hand side rear passenger, etc.) Further, several sub classifications can also be designated for the user from data provided by the electronic control unit 104 based on the utilization of additional sensors or systems within the vehicle 102 (e.g., adult/child passenger).

In an exemplary embodiment, if the user processing module 130 determines that, based on the positional location of the portable electronic device 114 when utilizing the device destination pointer application 126, the user is located in the front driver side seat, the user processing module 130 designates the user as a 'driver', and the device destination pointer application 126 is disabled/locked out in a similar fashion to the navigation system 112. If the user processing module 130 determines the user to be located in a passenger front or rear seat, the user processing module 130 designates the user as a 'passenger' and allows the user to use the device destination pointer application 126 to input a desired destination point to be utilized by the navigation system 112 to provide guidance as the navigation system 112 is locked out or unlocked.

In an alternate embodiment, if the user processing module 130 designates the user as a 'driver', the electronic control unit 104 sends a signal via the communication device of the vehicle 102 to the communication device 118 to be received by the control unit 116 to disable certain aspects of the driver's portable electronic device 114. In an additional embodiment, the user processing module 130 can designate the user as a 'driver' or a 'passenger' based off of the user ID of the user that is associated to the user identification username and password that is utilized to log into the device destination pointer application 126. In this embodiment, if the user ID is associated to a driver, the destination pointer application 126 is disabled once the electric control unit 104 sends a signal to the control unit 116 (in the manner described above) based on the state of movement of the vehicle 102. Alternatively, if the user ID is associated to a passenger, the destination point application 126 is enabled for the passenger to input a destination point to be utilized by the navigation system 112 to provide route guidance. In some embodiments, the localization data can be utilized as a means to verify that the passenger is utilizing the device destination pointer application 126 once a user logs into the portable electronic device 114 with a user ID corresponding to the passenger to ensure that in fact the passenger is utilizing the device destination pointer application 126.

In an additional embodiment, the user processing module 130 stores the name of the primary driver of the vehicle 102 that can be input directly into a user profile interface of the device destination pointer application 126. The user processing module 130 can obtain the name of the device owner from the control unit 116 (that can be programmed into a user profile of the portable electronic device 114). The user processing module 130 can evaluate the name of the device owner and determine if that name matches the name of the primary driver of the vehicle 102 to further determine if the primary driver is utilizing the device destination pointer application 126 or if additional analysis (such as discussed with reference to FIG. 2) is required. In some embodiments, the electronic control unit 104 can interpret data provided by seat sensors located within the vehicle 102 to determine which seats are being utilized by the driver and/or passenger(s). The electronic control unit 104 can send this data to the device destination pointer application 126 via the communication device 118 to determine if the driver is the only occupant within the vehicle 102 or if the passenger(s) is also within the vehicle 102. If it is determined that the passenger(s) is also within the vehicle, additional analysis (such as discussed with reference to FIG. 2) is completed to determine if the device destination pointer application 126 is being utilized by the driver or the passenger(s).

In an exemplary embodiment, while the vehicle 102 is in a state of movement, the passenger(s) can utilize the device destination pointer user interface 128 and provide inputs to the user input icons and/or user input tiles to input a desired destination point. In an alternate embodiment, if the vehicle 102 is not in a state of movement, the driver and/or the passenger(s) can utilize the device destination pointer user interface 128 and provide inputs to the user input icons and/or user input tiles to input a desired destination point. Once a desired destination point is inputted, a destination sending module 132 utilizes the communication device 118 of the portable electronic device 114 to send the destination point to the navigation unit 112 via the communication device of the vehicle 102. The sending of the destination point by the destination sending module 132 can occur directly from the device destination pointer application 126 to the navigation unit 112 or through the electronic control unit 104 to the navigation unit 112 to provide route guidance.

In one embodiment, once the user inputs a destination point that is sent by the destination sending module 132 and utilized by the navigation system 112 to provide route guidance, a cancel route user interface input icon appears on the device destination point user interface 128. If the user decides to cancel the route and the user inputs the cancel route user interface input icon, the device destination pointer application 126 sends a route cancellation request to the navigation system 112 via communication between the communication device 118 and the communication device of the vehicle 102. The navigation system 112 cancels the ongoing route guidance. The user can utilize the device destination pointer application 126 to provide a different destination point input.

Figure 3:
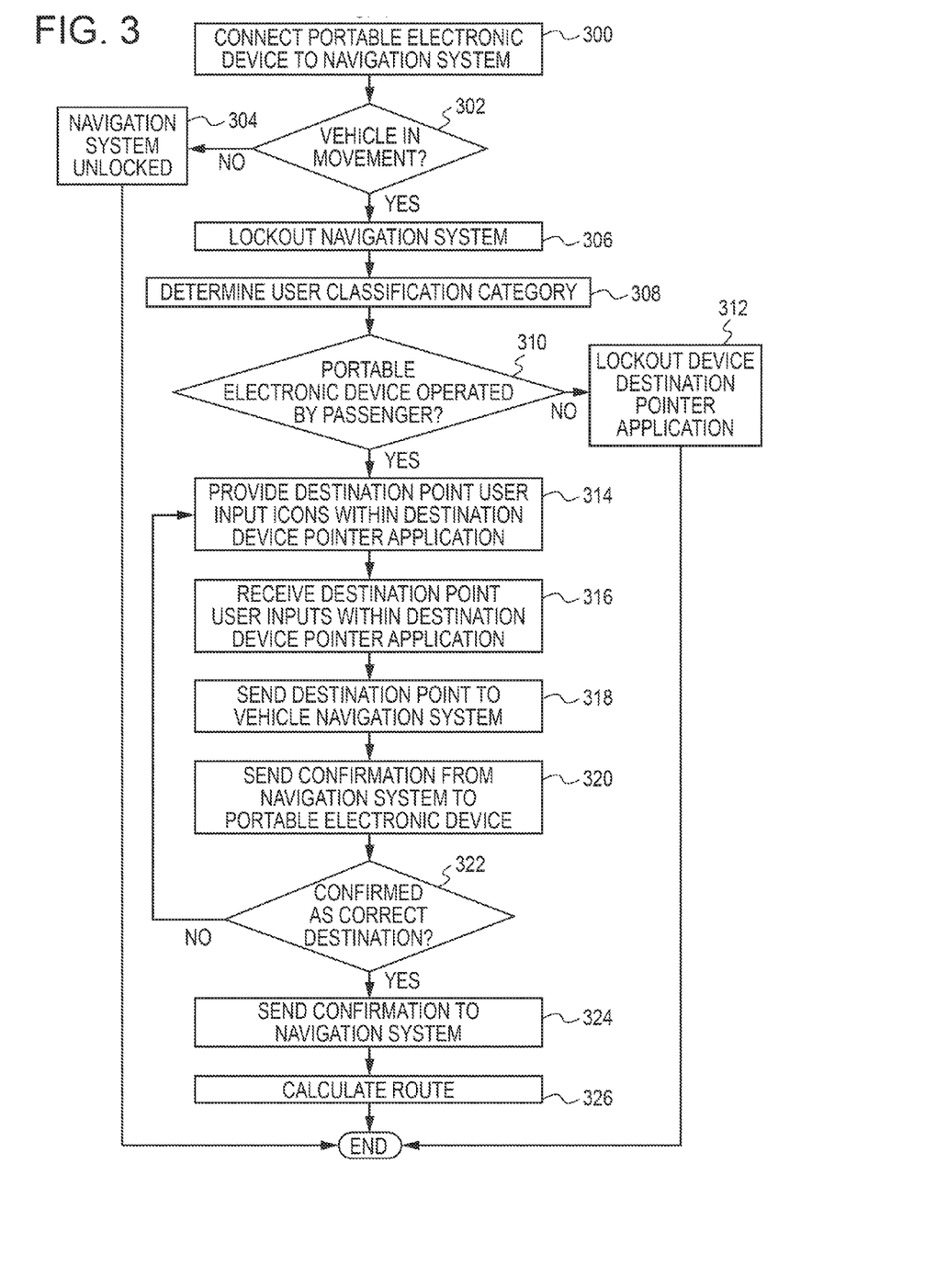
FIG. 3 is a process flow diagram of an exemplary method for inputting destinations from a portable electronic device to a vehicle navigation system according to an embodiment.

Referring now to FIG. 3, a process flow diagram of an exemplary method for inputting destinations from the portable electronic device 114 to the vehicle navigation system 112 using the device destination pointer system 100 is provided. The process begins at step 300 where the portable electronic device 114 connects to the navigation system 112 of the vehicle 102. As described in detail above, in one embodiment, the connection can take place between the communication device 118 and the communication device within the vehicle 102 that is connected through the electronic control unit 104. In an alternate embodiment, the connection can take place between the communication device 118 and the communication device within the vehicle 102 that is connected directly to the navigation system 112.

At step 302, the electronic control unit 104 determines if the vehicle 102 is in a state of movement by utilizing data provided by one or more of the engine control unit 106, the transmission control unit, the vehicle speed sensor 108, and/or the brake signal sensor 110. At step 304, if the electronic control unit 104 determines that the vehicle 102 is not in a state of movement (i.e., in a fully stopped state), the user interface of the navigation system 112 is unlocked. Therefore, the driver and/or passenger(s) can directly utilize the user interface of the navigation system 112 to provide destination point inputs. In one embodiment, the driver and/or passenger(s) can alternatively utilize the device destination pointer application 126 via the portable electronic device 114 to provide destination point inputs even when the user interface of the navigation system 112 is in an unlocked state.

At step 306, if the electronic control unit 104 determines that the vehicle 102 is in a state of movement, the user interface of the navigation system 112 is locked. Therefore, neither the driver nor the passenger(s) can directly utilize the user interface of the navigation system 112 to provide destination point inputs. The passenger(s) can alternatively utilize the device destination pointer application 126 to provide destination point inputs once it is determined that the passenger(s) and not the driver is actually utilizing the portable electronic device 114 to do so. At step 308, the user processing module 130 is employed to determine the user classification category of the user that is utilizing the portable electronic device 114. In an exemplary embodiment, as described in detail above, the locational data provided by the user processing module 130 and/or the user ID is used to determine the user classification category of the user as a 'driver' or a 'passenger'.

At step 310, it is determined if the portable electronic device 114 is operated by a passenger (i.e., the user classification category of the user is a 'passenger'). At step 312, if it is determined that the portable electronic device 114 is being operated by a driver and not the passenger(s) (at step 310), the device destination pointer application 126 is disabled/locked out to ensure that the driver can not utilize the application 126. At step 314, if it is determined that the passenger is utilizing the portable electronic device 114 (at step 310), the device destination pointer application 126 is enabled and the device destination pointer user interface 128 that includes user input icons and/or user input tiles that provide passengers with the ability to select from several destination point input choices is provided.

At step 316, once the passenger inputs the destination point (street address, a point of interest, a prior destination, a favorite destination, a latitude/longitude destination, a home destination input, etc.), the destination sending module 132 sends the destination point to the vehicle 102 via the communication device 118 through the electronic control unit 104 or directly to the navigation system 112. At step 318, the destination point is sent to the navigation system 112. The navigation system 112 determines the GPS coordinates and location of the destination point and sends a confirmatory message to the destination sending module 132 on the portable electronic device 114 via communication between the communication device of the vehicle 102 and communication device 118 of the portable electronic device 114.

In one embodiment, user interface icons appear to confirm or reject the destination. In an alternate embodiment, a timed message appears that asks the passenger to input a reject user input icon within a predetermined number of seconds if the destination point is not correct or the passenger wishes to change the destination point. If the destination point is not correct and/or the passenger wishes to change the destination point, the process returns to step 314 and the user is presented with the device destination pointer user interface 128.

If the passenger confirms the destination point as correct by either inputting the confirm user input icon or not inputting the reject user input icon, at step 324, the destination sending module 132 sends the confirmation to the navigation system 112, in a similar manner as the original destination point was sent. At step 326, the navigation system 112 calculates the route and provides route guidance to the driver of the vehicle 102. This method ensures that the navigation system 112 can be safely utilized to provide route guidance to the driver to a desired destination point that is inputted when the vehicle 102 is being driven and is in movement. In addition, if the passenger(s) are present in the vehicle 102, this method allows the driver to avoid stopping the vehicle 102 in order for a destination point to be inputted to the navigation system 112.

Figure 4:
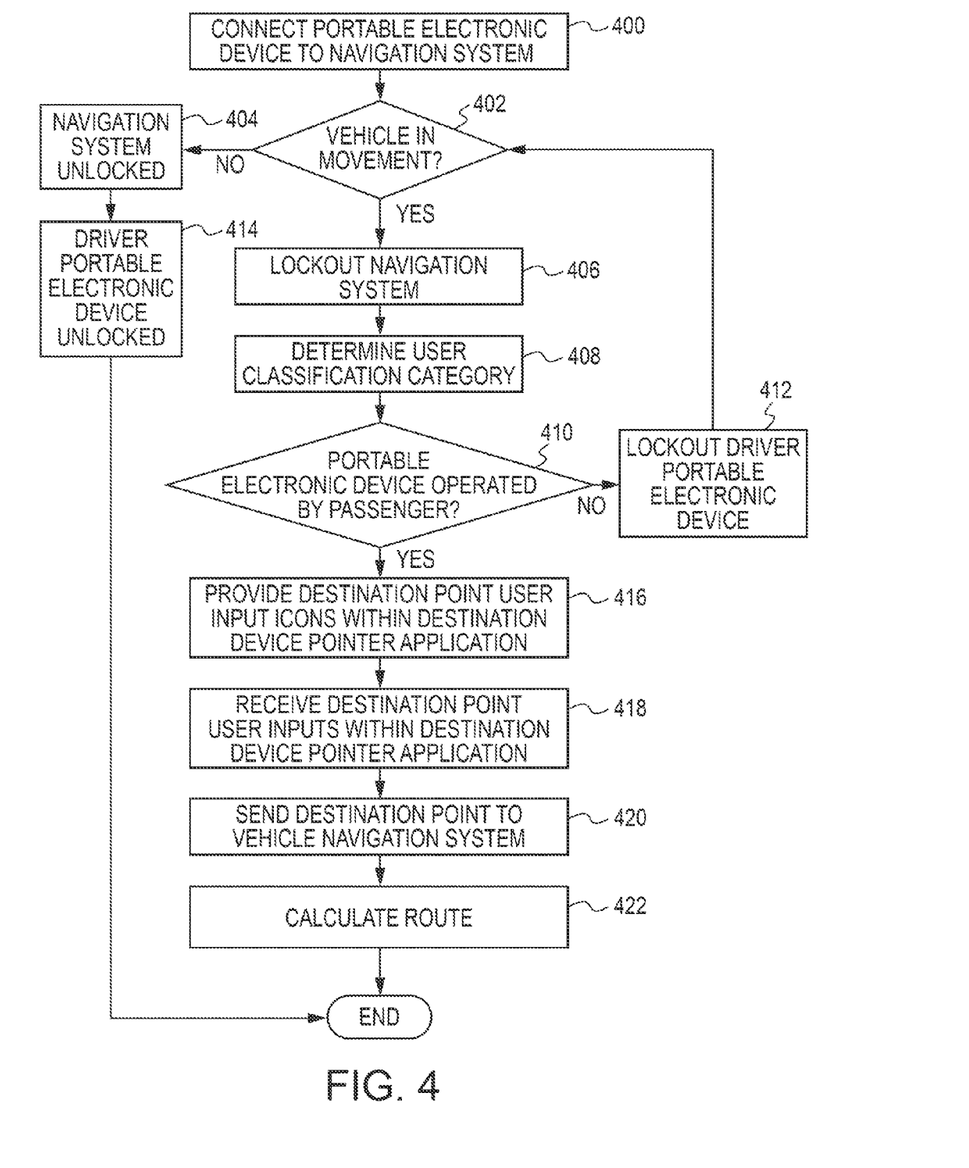
FIG. 4 is a process flow diagram of an exemplary method for inputting destinations from a portable electronic device to a vehicle navigation system according to an embodiment.

Referring now to FIG. 4, a process flow diagram of an alternate exemplary method for inputting destinations from the portable electronic device 114 to the vehicle navigation system 112 using the device destination pointer system 100. The process begins at step 400 where the portable electronic device 114 connects to the navigation system 112 of the vehicle 102 as described above. At step 402, the electronic control unit 104 determines if the vehicle 102 is in a state of movement. At step 404, if it is determined that the vehicle 102 is not in a state of movement (i.e., the vehicle 102 is in a full stop state), the user interface of the navigation system 112 is enabled/unlocked and can be utilized by the driver and/or passenger(s) to input a destination point. At step 414, the driver's portable electronic device 114 is unlocked/enabled for the driver to utilize applications including the device destination pointer application 126. The passenger(s) can continue to utilize the portable electronic device 114 regardless of the state of movement of the vehicle 102.

At step 406, if the electronic control unit 104 determines that the vehicle 102 is in a state of movement, the user interface of the navigation system 112 is locked. Therefore, neither the driver nor the passenger(s) can directly utilize the user interface of the navigation system 112 to provide destination point inputs. The passenger(s) can alternatively utilize the device destination pointer application 126 to provide destination point inputs once it is determined that the passenger(s) and not the driver is actually utilizing the portable electronic device 114 to do so. At step 308, the user processing module 130 is employed to determine the user classification category of the user that is utilizing the portable electronic device 114.

At step 412, if it is determined that the driver is utilizing the portable electronic device 114 (at step 410) (i.e., the user classification category is of a driver), then the driver's portable electronic device 114 is disabled. In other words, once the electronic control unit 104 determines that the vehicle 102 is in movement, along with disabling the navigation system 112, the electronic control unit 104 can disable the driver's ability to utilize select applications on the portable electronic device 114 or the portable electronic device 114 directly (without the use of steering and/or voice command inputs) thereby adding additional safety enhancing functionality. The driver's portable electronic device 114 is locked/disabled until the vehicle 102 is no longer in a state of movement (i.e., in a full stop state when the navigation system 112 is unlocked) at step 414.

At step 416 if it is determined that the passenger is utilizing the portable electronic device 114 (at step 410), the device destination pointer application 126 is enabled and the device destination pointer user interface 128 that includes user input icons and/or user input tiles that provide passengers with the ability to select from several destination point input choices is provided. At step 418, once the passenger inputs the destination point (street address, a point of interest, a prior destination, a favorite destination, a latitude/longitude destination, a home destination input, etc.), the destination sending module 132 sends the destination point to the vehicle 102 via the communication device 118 through the electronic control unit 104 or directly to the navigation system 112.

At step 420, the destination point is sent to the navigation system 112. At step 422, the navigation system 112 calculates the route and provides route guidance to the driver of the vehicle 102. This method ensures that the navigation system 112 can be safely utilized to provide route guidance to the driver to a desired destination point that is inputted and that the driver is not able to utilize his or her portable electronic device 114 when the vehicle 102 is being driven and is in movement, thereby decreasing driver distraction and promoting safer driving of the vehicle 102.

As discussed, various embodiments of the device destination pointer system 100 can be utilized for the user to provide destination points to the navigation system 112 of the vehicle 102. Also, various embodiments of the device destination pointer system 100 can be utilized to send other types of data (e.g., media, files, playlists, etc.) to numerous vehicle 102 systems (e.g., audio system, infotainment system, etc.). In addition, numerous components and technologies that have not been discussed herein can be utilized to compute operations associated with the device destination pointer application 126 and to provide inputs to the navigation system 112. It is to be appreciated that in addition of the portable electronic device 114, the device destination pointer application 126 can be utilized on and/or with different types of devices that are in production and that are not yet in production. For example, the device destination pointer application 126 can be installed and utilized by connecting to a (alternate or secondary) navigation system 112 that is presented on a heads up display within the vehicle 102.

The embodiments discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media is limited to non-transitory computer-readable medium.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

The invention claimed is:

1. A method for sending a destination point to a vehicle navigation system while the vehicle is in movement comprising:
   connecting one or more portable electronic devices to the navigation system;
   identifying a user classification category of one or more users that are operating the one or more portable electronic devices that are connected to the navigation system; and
   sending the desired destination point from the one or more portable electronic devices to the navigation system based on the user classification category;
      wherein sending the desired destination point from the one or more portable devices to the navigation system occurs upon determining that direct input to a user interface of the navigation system is locked out and includes the navigation system computing a navigational route to the desired destination point sent from the one or more portable electronic devices to the navigation system.

2. The method of claim 1, comprising determining a navigation system lockout state by determining if the vehicle is in movement.

3. The method of claim 2, wherein determining the navigation system lockout state comprises communicating with at least one of: an electronic control unit, an engine control unit, a vehicle speed sensor, and a brake signal sensor to determine the state of motion of the vehicle.

4. The method of claim 3, wherein connecting one or more portable electronic devices to the navigation system comprises utilizing a wireless connection between one or more portable electronic devices and at least one of: an electronic control unit of the vehicle, the navigation system of the vehicle.

5. The method of claim 1, wherein identifying the user classification category of the users that are operating the one or more portable electronic devices comprises determining if a driver or one or more passengers is operating the one or more portable electronic devices that are connected to the navigation system.

6. The method of claim 5, wherein determining if a driver or passenger is operating the one or more portable electronic devices that are connected to the navigation system comprises at least one of: determining the cardinal and ordinal position of the one or more portable electronic devices with respect to the vehicle while the user is operating the one or more portable electronic devices to send a desired destination point to the navigation system, and determining if the portable electronic device is associated with the driver or the passenger when the user logs into a linked application on the portable electronic device with a user ID that is linked to the driver or the passenger.

7. The method of claim 1, wherein sending the desired destination point from the one or more portable devices to the navigation occurs upon determining that the sending of the desired destination point from the one or more portable electronic devices that are determined as being operated by the one or more passengers.

8. The method of claim 1, wherein sending the desired destination point from the one or more portable devices to the navigation sent from the one or more portable electronic devices to the navigation system includes sending at least one of: a street address destination, a point of interest destination, a prior destination, a favorite destination, a latitude/longitude input destination, and a home destination based on the user's desired destination point.

9. The method of claim 1 comprising, executing a lockout state of one or more portable electronic devices that are determined as being operated by the driver.

10. A system sending a destination point to a vehicle navigation system while the vehicle is in movement comprising:
a device destination pointer application that is executed on one or more portable electronic devices that connects the one or more portable electronic devices to the navigation system;
a user processing module that is included as a module of the device destination pointer application that identifies a user classification category of one or more users that are operating the one or more portable electronic devices that are connected to the navigation system; and
a destination sending module that is included as a module of the device destination pointer application that sends the desired destination point from the one or more portable electronic devices to the navigation system based on the user classification category;
wherein the destination sending module sends the desired destination point from the one or more portable devices to the navigation system upon determining that the direct input to a user interface of the navigation system is locked out and includes the navigation system computing a navigational route to the desired destination point sent from the one or more portable electronic devices to the navigational unit.

11. The system of claim 10, comprising a communication device for authenticating and connecting one or more portable electronic devices to the navigation system via a wireless peer to peer connection within the vehicle.

12. The system of claim 10, comprising an electronic control unit determining if the vehicle is in movement.

13. The system of claim 10, wherein the electronic control unit communicates with at least one of: an engine control unit, a vehicle speed sensor, and a brake signal sensor to determine the state of motion of the vehicle.

14. The system of claim 10, wherein the user processing module establishes a user classification category by determining if a driver or one or more passengers is operating the one or more portable electronic devices that are connected to the navigation system.

15. The system of claim 14, wherein the user processing module determining if the driver or passenger is operating the one or more portable electronic devices that are connected to the navigation system includes at least one of: communicating with a plurality of sensors of the corresponding one or more portable electronic devices to determine the cardinal and ordinal position of the one or more portable electronic devices with respect to the vehicle while the user is operating the one or more portable electronic devices to send a desired destination point to the navigation system, and determining if the portable electronic device is associated with the driver or the passenger when the user logs into a linked application on the portable electronic device with a user ID that is linked to the driver or passenger.

16. The system of claim 10, wherein the destination sending module only allows the sending of the desired destination point from the one or more portable electronic devices that are determined as being operated by the one or more passengers.

17. The system of claim 10, wherein the device destination pointer application accepts inputs that are sent by the destination sending module to the navigation system that include at least one of: a street address destination, a point of interest destination, a prior destination, a favorite destination, a latitude/longitude input destination, and a home destination.

18. The system of claim 10 comprising, the navigation system receiving the desired destination point from the one or more portable electronic devices and determines the GPS coordinates and location of the destination point, wherein the navigation system completes at least one of: sending a confirmatory message to the destination sending module on the portable electronic device and providing route guidance once confirmation is received from the destination sending module, and providing immediate route guidance to the to the desired destination point.

19. The system of claim 10 comprising, the navigation system lockout module executing a lockout state of one or more portable electronic devices that are determined as being operated by the driver.

20. A non-transitory computer readable storage medium comprising instructions that when executed by a computer, which includes a processor perform a method, the method comprising:
connecting one or more portable electronic devices to the navigation system;
identifying a user classification category of one or more users that are operating the one or more portable electronic devices that are connected to the navigation system; and
sending the desired destination point from the one or more portable electronic devices to the navigation system based on the user classification category;

wherein sending the desired destination point from the one or more portable devices to the navigation system occurs upon determining that direct input to a user interface of the navigation system is locked out and includes the navigation system computing a navigational route to the desired destination point sent from the one or more portable electronic devices to the navigation system.

\* \* \* \* \*